United States Patent [19]

Kinoshita et al.

[11] Patent Number: 5,347,698

[45] Date of Patent: Sep. 20, 1994

[54] METHOD FOR ASSEMBLY AND INSPECTION OF OPTICAL FIBER CONNECTORS

[75] Inventors: Isamu Kinoshita; Kenji Suzuki; Nobuyuki Shibata; Toshimitsu Nishiwaki, all of Ichihara, Japan

[73] Assignee: The Furukawa Electric Co., Ltd., Tokyo, Japan

[21] Appl. No.: 912,333

[22] Filed: Jul. 13, 1992

[30] Foreign Application Priority Data

Jul. 15, 1991 [JP] Japan .................................. 3-200077

[51] Int. Cl.5 ........................................... B23Q 17/20
[52] U.S. Cl. ......................................... 29/407; 29/530; 356/73.1; 356/237; 385/99
[58] Field of Search ................... 29/407, 433, 527.1, 29/527.2, 530; 73/866, 865.9; 356/73.1, 237; 385/95–99, 56, 15

[56] References Cited

U.S. PATENT DOCUMENTS

| | | | |
|---|---|---|---|
| 4,639,130 | 1/1987 | Koike et al. | 356/73.1 |
| 4,708,476 | 11/1987 | So et al. | 356/73.1 |
| 4,726,676 | 2/1988 | Maslaney et al. | 356/73.1 |
| 4,746,194 | 5/1988 | Rasmussen | 385/82 X |
| 4,892,381 | 1/1990 | Glasheen | 29/851 X |
| 4,907,852 | 3/1990 | Noba et al. | 385/58 |
| 5,037,197 | 8/1991 | Bukhshtab et al. | 356/73.1 |
| 5,090,802 | 2/1992 | Longhurst | 356/73.1 |
| 5,136,818 | 8/1992 | Bramson | 356/73.1 X |

*Primary Examiner*—Timothy V. Eley
*Attorney, Agent, or Firm*—Staas & Halsey

[57] ABSTRACT

Disclosed a method of assembly and inspection of optical fiber connectors which attaches connectors to at least one cord end of a plurality of optical fiber cords in which single or multiple optical fibers are accommodated and inspects connection loss etc. due to connection of the connectors.

A process of connecting the connectors to cord ends where the connectors are assembled is linked to a process of processing the other cord ends and then inspecting connection loss etc. of the optical fibers due to a connection of the connectors.

5 Claims, 8 Drawing Sheets

METHOD FOR ASSEMBLY AND INSPECTION OF OPTICAL FIBER CONNECTORS

BACKGROUND OF THE INVENTION

1. Field of the Invention

The present invention relates to a method and an apparatus of assembly and inspection of optical fiber connectors which attach connectors to the ends of optical fiber cables having a single optical fiber cord or multiple optical fiber cords and measure the connection loss etc. of the connectors.

2. Description of the Related Art

Some optical fiber cables accommodate large numbers of optical fiber cords in which one or more optical fibers are accommodated.

The assembly of connectors to a large number of cord ends of optical fiber cords led out from the ends of optical fiber cables and the measurement of the connection loss etc. of the connectors are performed manually. In this case, to inspect optical fiber cords where the connectors are assembled, in general the cord ends of the other side of the optical fiber cords to which connectors are assembled are searched for among a large number of other cord ends and a light beam is passed through the optical fiber cords to measure the connection loss.

Even when automating the assembly of connectors to the optical fiber cords, after the connectors are assembled, the optical fiber cords with the connectors attached are arranged in a predetermined order, and the cord ends on the inspection light emission side corresponding to the cord ends where the inspection light is beamed in are searched for among the plurality of cord ends so as to inspect the optical fibers.

In this way, in the conventional method of assembly and method of inspection of optical fiber connectors, the assembly and inspection of the connectors were not performed continuously, so after a connector was assembled to one end of an optical fiber cord, there was the trouble of searching for the other end of the optical fiber cord to which the connector was assembled, which complicated the inspection process.

Further, even when automating the assembly of connectors to the optical fiber cords, there was the trouble of storing the cords in a predetermined order so as to enable the fibers desired to be inspected to be easily found.

Note that this type of problem occurs not only in optical fiber cables having a plurality of optical fiber cords but also in the case of connection of connectors to the ends of large numbers of single-core or multi-core optical fiber cords (including the case where the optical fibers cords themselves are referred to as optical fiber cables) bound together.

SUMMARY OF THE INVENTION

The present invention was made so as to effectively eliminate the problems in the prior art and has as its object the provision of a method and an apparatus of assembly and inspection of optical fiber connectors which achieve automation of the processes of assembly and inspection of optical fiber connectors and in particular facilitate the inspection work and reduce the inspection time.

To achieve the above-mentioned object, the method of assembly and inspection of the present invention is one wherein a process of connecting the connectors to cord ends where the connectors are assembled is linked to a process of processing the other cord ends and then inspecting connection loss etc. of the optical fibers due to a connection of the connectors.

Further, the apparatus for assembly and inspection of optical fiber connectors of the present invention has a connector side end processing means wherein cord ends of a plurality of optical fiber cords in which single or multiple optical fibers are accommodated are arranged at a predetermined feed pitch, connectors are connected successively to the arranged cord ends, and an inspection light beam is inputted to the cord ends with the connectors connected, an inspection side end processing means which arranges the other cord ends the optical fiber cords at a predetermined feed pitch linked to that of said connector side end processing means, successively performs end processing on the cord ends so as to place the optical fibers accommodated in the cords in an inspectable state, successively emits an inspection light beam correspondence with the inspection light beam by said connector side end processing means from the cord ends placed in an inspectable state on the other side, and receives the inspection light beam so as to inspect the optical fibers.

According to the present invention, a process of connecting the connectors to cord ends where the connectors are assembled is linked to a process of processing the other cord ends and then inspecting connection loss etc. of the optical fibers due to a connection of the connectors, so the process of assembly of the connectors and the process of inspection can be performed continuously. Further, connector processors, end processing processors, and inspection processors are deployed around the arranged cord ends, so automation of the connection of the connectors and inspection of the optical fibers becomes easy. Further, the optical fibers are inspected successively and continuously for every optical fiber cord where a connector has been connected, so the trouble of a person having to find the other end of an optical fiber cord to which a connector has been connected is eliminated and it becomes possible to streamline the inspection process and shorten the inspection time.

BRIEF DESCRIPTION OF THE DRAWINGS

The above and other objects and the above and other features of the present invention will be described in detail with reference to the accompanying drawings, in which.

DESCRIPTION OF THE PREFERRED EMBODIMENTS

Figure 1:
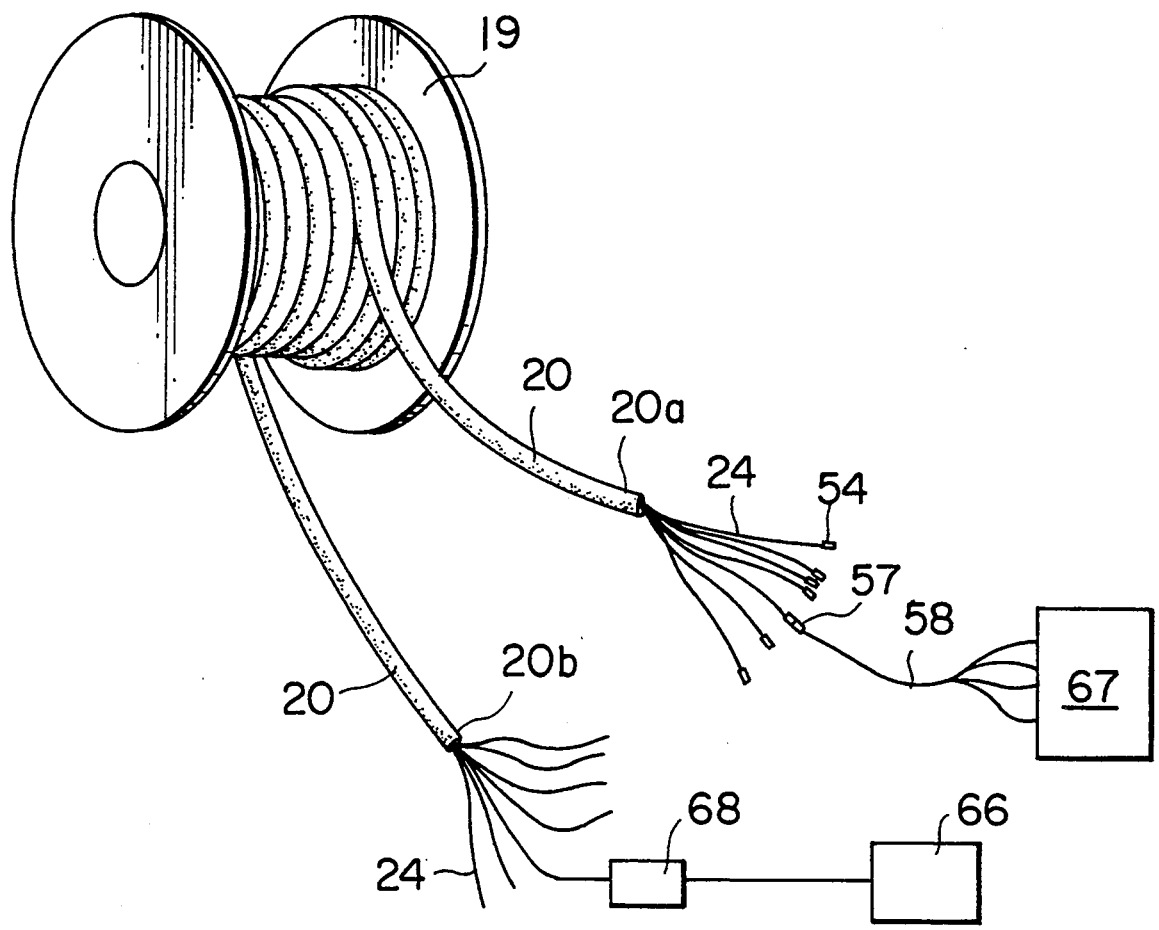
FIG. 1 is a schematic perspective view showing a method of assembly and inspection of optical fiber connectors according to an embodiment of the present invention.

As shown in FIG. 1, in the method of assembly and inspection of connectors according to an embodiment of the present invention, connectors 54 are attached to the plurality of optical fiber cords 24 led out from the end 20a of an optical fiber cable 20 wound on a cable drum 19. Details of the method of assembly of the connectors 54 will be discussed later.

When the assembly of the connectors 54 is ended, a connector 54 is connected to a master connector 57 and an inspection light beam is inputted through the master connector 57 to the optical fiber cord 24. The transmission loss of the master connector 57 and the master cord 58 are known.

On the other hand, at the other end 20b of the optical fiber cable 20, a light receiving sensor 68 and light power meter 66 are connected to the other end of the optical fiber cord to which the inspection light beam has been inputted from the other end, the inspection light beam coming out from the end of the cord 24 is received by the light receiving sensor 68, and the optical transmission loss is measured by the light power meter 66. If the transmission loss of the optical fiber cord 24 is known, the connection loss of the connector 54 can be calculated.

In this embodiment, the process of assembling the connectors successively to the large number of optical fiber cords 24 accommodated in an optical fiber cable 20 and the process of inspecting of the connection loss etc. due to the connection of the connectors are continuously and automatically performed using the later mentioned apparatuses.

Figure 2:
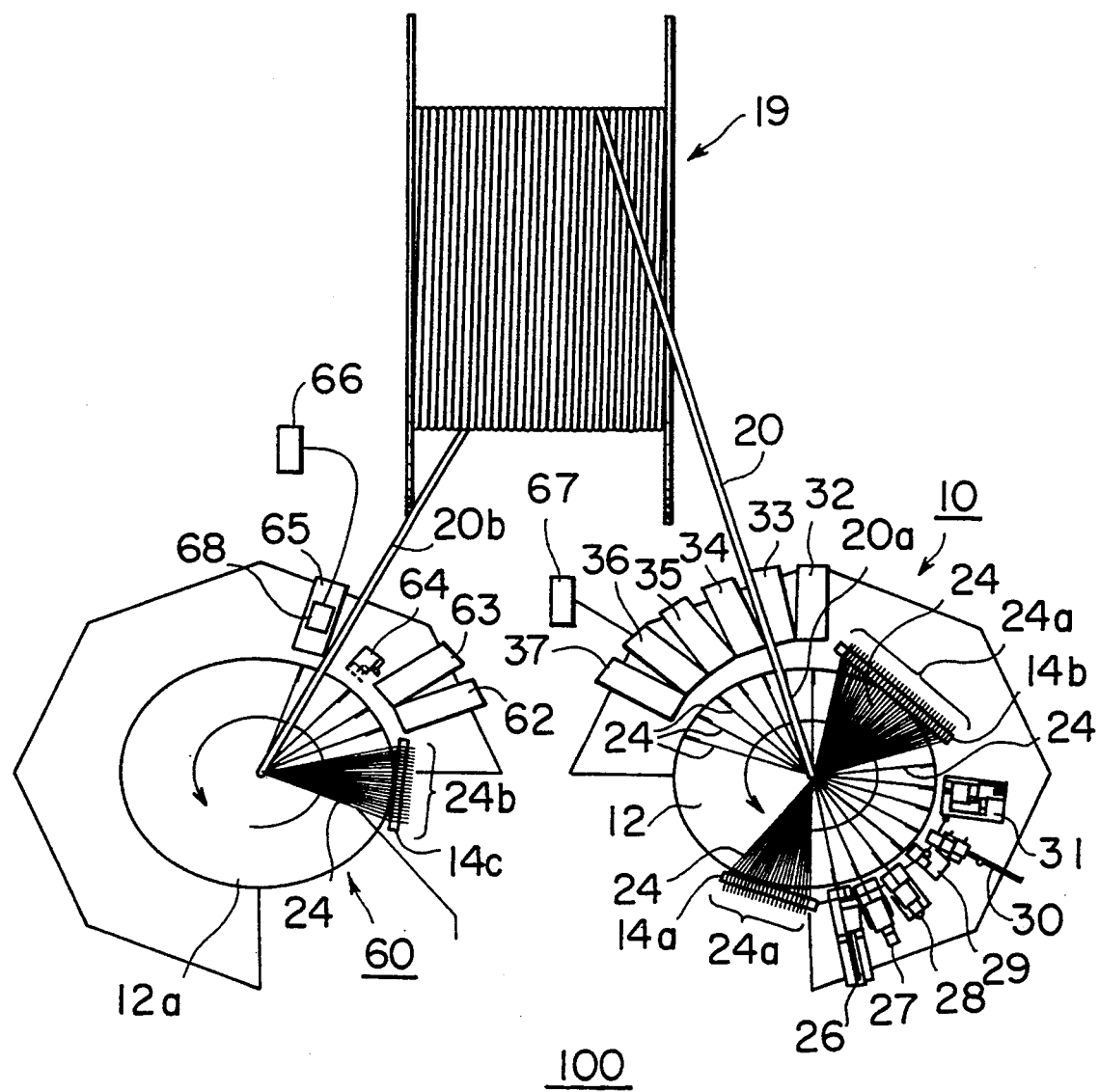
FIG. 2 is an overall schematic structural view showing an apparatus for assembly and inspection of an optical fiber connector according to an embodiment of the present invention.

As shown in FIG. 2, the apparatus 100 for assembly and inspection of the optical fiber connectors according to an embodiment of the present invention has a connector side processing apparatus 10 and an inspection side end processing apparatus 60.

The connector side processing apparatus 10 has a disk-shaped index table 12, a setting conveyor 14a, and a heating and drying conveyor 14b.

Figure 3:
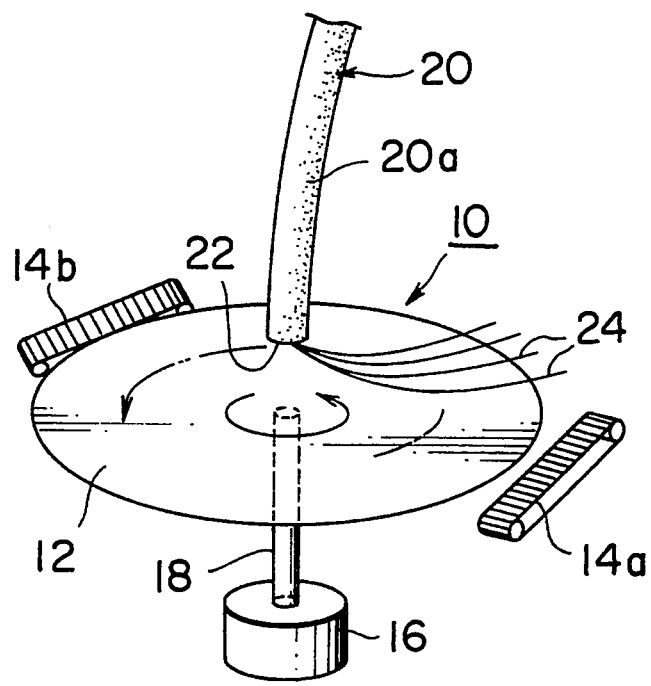
FIG. 3 is a schematic perspective view showing key portions of the same apparatus.

The index table 12 is designed to be rotated by a drive shaft 18 which is driven to rotate by a pulse motor 16 shown in FIG. 3. The cable 20 is attached so that the leadout portion 22 provided at the end 20a of the optical fiber cable 20 wound on the cable drum 19 is positioned above the center position of the index table 12. The cord ends of the plurality of optical fiber cords 24 led out from the leadout portion 22 of the cable 20 are laid radially on the table 12 at a predetermined pitch angle of arrangement.

The pitch angle of arrangement of the cord ends is made to match the pitch angle of arrangement of the processors 26 to 37 disposed around the table 12 and shown in FIG. 2. The operations of these processors will be explained later.

The cord ends of the optical fiber cords 24 arranged on the table 12 are indexed by a predetermined feed pitch angle every predetermined tact time by driving of the table 12 by a pulse motor 16. In this embodiment, the feed pitch angle coincides with the pitch angle of arrangement. The tact time is matched with the time of the process requiring the longest time among the times of the end processing processes by the processors 26 to 37.

The setting conveyor 14a and the heating and drying conveyor 14b are set above the outer circumferential position of the index table 12. On these conveyors 14a and 14b are laid the cord ends of the optical fiber cords at a pitch angle of arrangement smaller than the pitch angle of arrangement of the index table 12.

Figure 4:
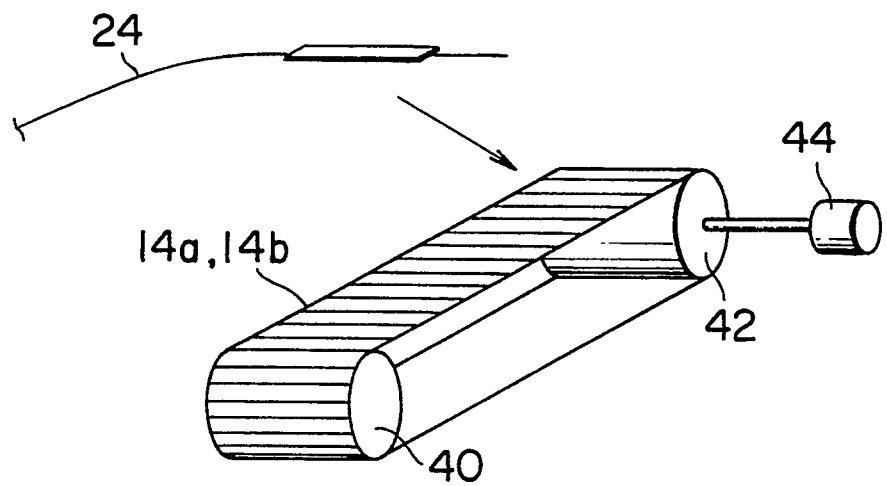
FIG. 4 is a schematic perspective view of an index conveyor shown in FIG. 3.

The conveyors 14a and 14b, for example, as shown in FIG. 4, are comprised of endless belts put between a pair of rollers 40 and 42. One of the rollers is driven to rotate by a pulse motor 44, whereby the cord ends of the optical fiber cords 24 placed on the conveyor 14a are indexed at a predetermined feed pitch angle. The feed pitch angle by the conveyors 14a and 14b matches the pitch angle of arrangement at the conveyors and is smaller than the feed pitch angle at the table 12. The indexing by the conveyors 14a and 14b is performed synchronously with the indexing by the table 12. For example, in synchronization with the feed of the table 12 by the feed pitch angle of 12 (twelve) degrees every 30-second tact time, the conveyors 14a and 14b are indexed at a feed pitch angle in a fraction of 12 degrees every 30 seconds.

Next, an explanation will be made of the processors 26 to 37 which are arranged around the index table 12.

Figure 6:
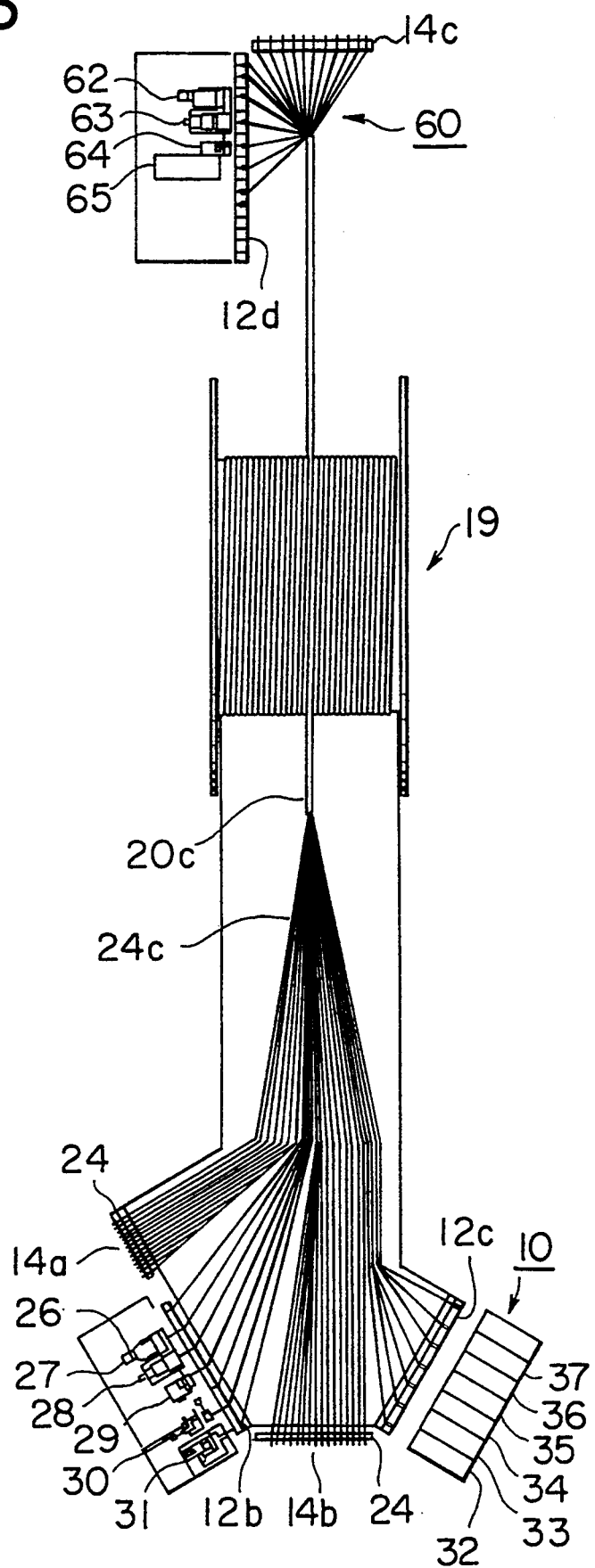
Figure 8A:
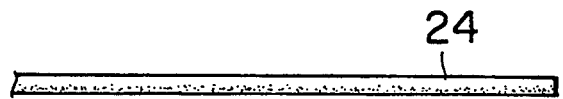
FIG. 8 is an explanatory view showing a process for assembling an optical fiber connector.
Figure 8B:
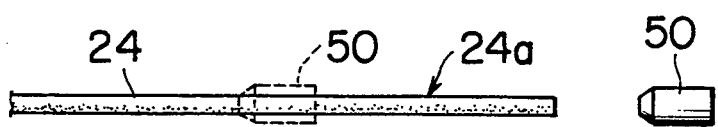

The processor 26, as shown in FIG. 8(B), is a boot attaching apparatus for inserting the cord end 24a of an optical fiber cord 24 led out from the leadout portion of the optical fiber cable (see FIG. 8(A)) into the through hole of the boot 50 and attaching the boot 50 over the outer circumference of the cord 24. The optical fiber cord 24 used in the present embodiment is a tape-like multi-core optical fiber cord in which four optical fibers 52 are accommodated in a row, as shown in FIG. 6. The boot 50 is comprised, for example, of a rubber material. The cord 24 is inserted into the boot as shown in FIG. 8(B) and FIG. 8(C), and the boot is connected to the rear end of the connector in a later process to prevent the cord from bending.

Figure 8C:
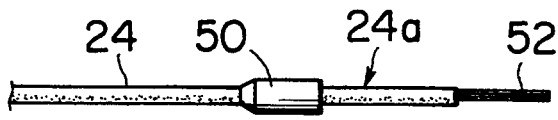

The processor 27, as shown in FIG. 8(C), is a stripping apparatus for stripping the tip of the cord end 24a on which the boot 50 is attached by the apparatus 26 to expose the front ends of the optical fibers 52. The stripping is performed, for example, by stripping a length of 18 to 22 mm from the front ends and cutting by a cutting machine to a length of 9 to 11 mm.

Figure 8D:
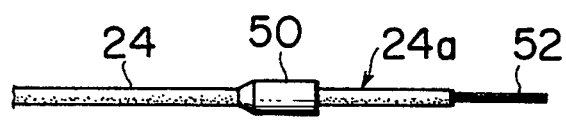

The processor 28, as shown in FIG. 8(D), is a wiping apparatus for wiping off and cleaning the outer circumferential surface of the exposed optical fibers 52.

Figure 8E:
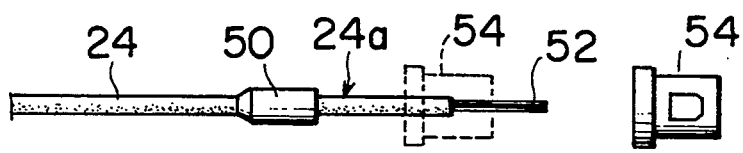
Figure 10:
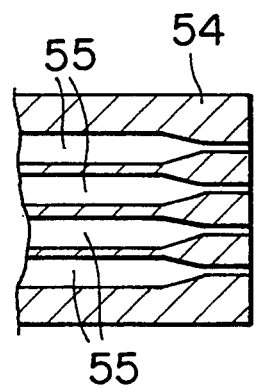
FIG. 10 a longitudinal sectional view of key portions of the connector.

The processor 29, as shown in FIG. 8(E), is a connector attaching apparatus for passing the optical fibers 52 through the through holes 55 formed in the connector 54 as shown in FIG. 10 and attaching the connector 54 to the cord end 24a so as expose the same from the front end of the connector 52.

Figure 8F:
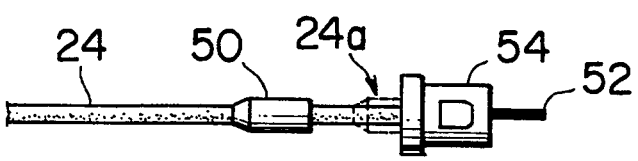

The processor 30, as shown in FIG. 8(F), is a boot moving apparatus which moves the boot 50 to the front end of the cord 24 and connects the boot 50 to the rear end of the connector 54. The boot 50 is connected so as to prevent leakage of the adhesive from the rear end of the connector at the time of injection and coating of the adhesive at a later process.

Figure 8G:
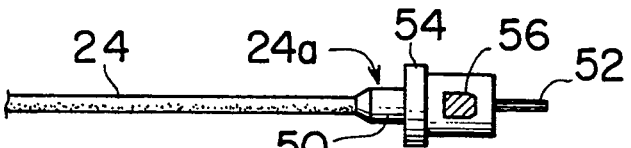

The processor 31, as shown in FIG. 8(G), is an adhesive injection apparatus for injecting and coating an adhesive in a window 56 formed in the connector 54 to fix the optical fibers 52 passed through the connector 54 to the connector 54.

(The cord end 24a having the connector 54 is dried in the drying process after the adhesive is injected by the processor 31. The cord end 24a is then processed by the end processors 32 to 35. Therefore, a conveyor 14b for the drying process is placed, as shown in FIG. 2, between the processor 31 and the end processor 32 to remove the cord end 24a from processor 31 to end processor 32. On this conveyor 14b, the cord ends 24a of the optical fiber cords are laid at arrangement pitch angles smaller than the arrangement pitch angles on the index table 12. The cord ends 24a arranged on the index table 14b are heated and dried at a temperature of about 80° to 150° C. for 10 to 60 minutes to heat and dry the adhesive. The heating temperature and the heating time depend on the type of the adhesive used.

Figure 8H:
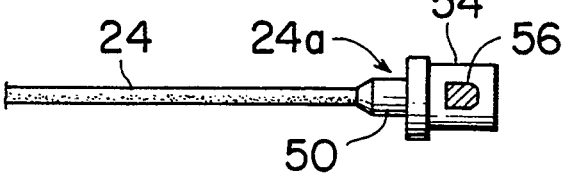
Figure 9:
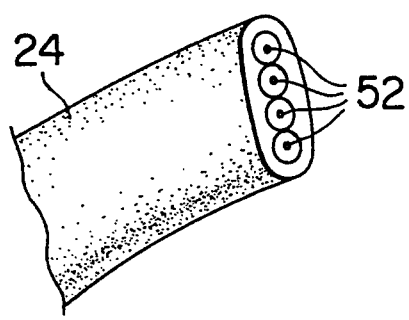
FIG. 9 is a schematic view showing an end of an optical fiber cord.

The end processors 32 to 35 shown in FIG. 2, as shown in FIG. 8(H), are apparatuses for cutting the optical fibers 52 exposed from the front end of the connector 54 and polishing the front end surfaces of the optical fibers 52.

The processor 36 is an apparatus for connecting the measurement use master connector 57, as shown in FIG. 1, to a connector 54 and inspecting the connection loss etc. of the optical fibers in the optical fiber cord 24 to which the master connector 57 is connected. An inspection light beam from the light source 67 is inputted into the processor 36. The end processor 37 is an apparatus for taking out the cord ends 24a after inspection.

Cord ends 24a before end processing are set by hand. A handling apparatus for automatically resetting the cord ends 24a from the conveyor 14a to the index table 12 at the rear end of the conveyor 14a, is provided near the setting conveyor 14a in front of the processor 26 so as to set cord ends before end processing by hand. Handling apparatuses are provided at the transfer portion of the cord ends 24a between the starting end of the conveyor 14b for heating and drying the adhesive and the index table 12 and at the cord end transfer portion between the finishing end of the conveyor 14b and the index table 12 so as to perform the transfer of the cord ends 24a at the table 12 and the conveyors 14a and 14b.

Next, an explanation will be made of an inspection side end processing apparatus 60.

The processing apparatus 60, as shown in FIG. 2, has an index table 12a and a setting conveyor 14c with a smaller pitch of feed than that of the index table 12a.

In the processing apparatus 60, the setting conveyor 14c and the end processors 62 to 65 for the processing for measurement of the connection loss are set around the index table 12a. The setting conveyor 14c has the same function as the above-mentioned setting conveyor 14a. At the end point portion of the setting conveyor 14c, a handling apparatus, not shown, is installed, which performs the transfer of the cord ends 24b from the conveyor 14c to the table 12a. The pitch of arrangement and the pitch of feed of the cord ends 24b on the conveyor 14c are the same as the conveyor 14a. The pitch of arrangement and the pitch of feed of the cord ends 24b on the table 12a are the same as the table 12.

The processor 62 is a stripping apparatus which strips the cord ends 24b in the same way as the processor 27. The processor 63 is a wiping apparatus for performing a wiping process in the same way as the processor 28. The processor 64 is an apparatus for attaching a master connector corresponding to the master connector attached by the processor 36. Further, the processor 65 is a measurement apparatus for measuring the connection loss and for inspecting the fiber correspondence and has a light receiving sensor 68 connected to the light power meter 66. The inspection of the fiber correspondence means the inspection for checking if the four optical fibers 52 are inserted in proper order in the connector 54 shown in FIG. 10.

This inspection side end processing apparatus 60 is an apparatus which is linked to the end processing apparatus 10 and performs inspection processing at the same time as end processing.

That is, an inspection light beam is inputted from the light source 67 to the master connector connected by the apparatus 36 in the connector side end processing apparatus 10. The other ends of the optical fiber cords 24 from which the incident light is ejected are set so as to be successively positioned at the inspection apparatus 65 of the end processing apparatus 60. The inspection of the connection loss and the inspection of the fiber correspondence are performed using the light receiving sensor 68 and the light power meter 66.

In the apparatus 36 and the apparatus 65 in the two processing apparatuses 10 and 60, it is necessary that the same optical fiber cord 24 be set at the same time. To that end, if the two ends are set in the same order, even if the time required for the end processing differs, it is possible to achieve correspondence by that order.

In the above-mentioned embodiment, the case is shown where end processing and inspection are simultaneously performed on an optical fiber cable with a connector at only one end and with the other end with the fibers as they are, but the apparatus of the present invention may be applied as well to cables with connectors at both ends. In this case, processing is performed by the end processing apparatus 10 at both of the ends of the optical fiber cables.

Next, an explanation will be made of the mode of operation of the apparatus 100 for assembly and inspection of optical fiber connectors.

First, the root of the leadout portion where the optical fiber cords 24 are led out at the end portion of the optical fiber cable 20 lead out from the cable drum 19 is fixed at a position above the center of the index table 12, and the cord ends are successively set on the setting conveyor 14a. The feed pitch of the conveyor 14a is set to a small pitch of an extent corresponding to a fraction of the feed pitch of the index table 12.

Therefore, the cord ends 24a set on the conveyor 14a are indexed by a short pitch every one tact time and are transferred on to the index table 12 by the handling apparatus, which is placed at the end portion of the index conveyor 14a. The index table 12 is fed at a feed pitch corresponding to an arrangement pitch angle of the processors 26 to 30 at every tact time. The end processing processes of FIG. 8(B) to (g) are successively performed by the processors 26 to 31.

After this, the cord ends 24a are successively transferred on to the heating and drying conveyor 14b and once again indexed at a short pitch. During the time required for drying, it accumulates on the index conveyor 14b. Then the cord ends 24a are returned to the index table 12 by the handling apparatus at the end portion of the index conveyor 14b, are fed by the feed pitch angle of the index table, and are processed by the processors 32 to 37.

On the other hand, in the inspection side end processing apparatus 60, processing is performed for measurement at the ends in the same order as the order of the optical fiber cords 24 processed by the processing apparatus 10. Therefore, when an inspection light beam is made incident from the light source 67 to the master connector connected by the apparatus 36 in the connector side end processing apparatus 10, the other ends of the optical fiber cords 24 where the incident light is emitted are successively positioned at the inspection apparatus 65 of the end processing apparatus 60 and it is possible to inspect the loss and inspect the fiber correspondence using the light receiving sensor 68 and the light power meter 66.

Note that the present invention is not limited to the above-mentioned embodiments and it is possible to change it in various manners within the scope of the present invention.

In the above-mentioned embodiment, in the case that one of the cord ends of the optical fiber cords is set at the connector side processing apparatus 10 at a predetermined feed pitch, and in the case that the other cord end is set at the predetermined feed pitch interlocking with the connector side end processing apparatus, these cord ends are laid each like in a circle, and the processors 26 to 37 and 62 to 65 are also laid each like in a circle. But the general idea of the predetermined feed pitch in the present invention is not limited to the above-mentioned embodiment.

Figure 5:
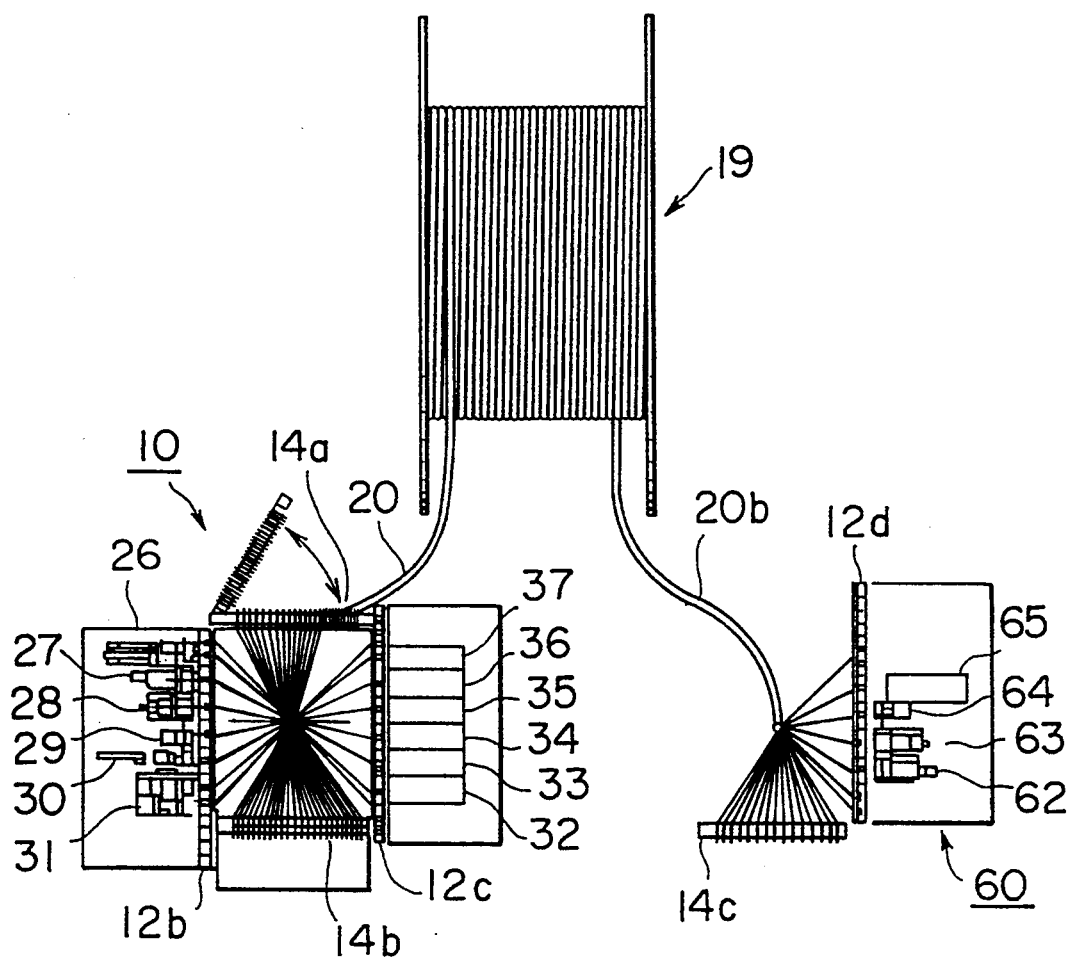
FIG. 5 and FIG. 6 are overall schematic structural views showing apparatuses for assembly and inspection of an optical fiber connector according to other embodiments of the present invention.

For example, the apparatus for assembly and inspection shown in FIG. 5 has conveyance means 12b, 12c, 12d instead of the index tables 12, 12a shown in FIG. 2, which are enabled to reciprocate straight.

That is, the processors 26 to 31 and 32 to 37 of the connector side end processing apparatus 10 are laid straight on the opposite side around the attachment place of the root of the leadout portion where the optical fiber cords are led out as a center. The conveyance means 12b, 12c are laid at the root side of the leadout portion where the optical fiber cords are led out in each processors. And conveyors 14a, 14b are laid between these conveyance means 12b, 12c, then the arrangement shape of the conveyance means 12b, 12c and conveyors 14a, 14b is like rectangular.

The processors 62 to 65 of the inspection side end processing apparatus 60 are also laid straight against the attachment place of the roof of the leadout portion where the optical fiber cords are led out. The conveyance means 12d is laid along these processors 62 to 65, and a conveyor 14c is laid at the half-rectangular place.

As a result of this arrangement, it becomes easy to constitute these processors 26 to 37 and 62 to 65, and it improves to maintain them.

Further, in the apparatus for assembly and inspection shown in FIG. 6, the processors 26 to 37 and 62 to 65 of the connector side end processing apparatus and the inspection side end processing apparatus 60 are laid on the opposite side each other, especially, the processors 26 to 37 of the connector side end processing apparatus are laid on far from the attachment place of the root of the leadout portion where the optical fiber cords are led out.

This apparatus is able to be applied in the case of sufficient length of the cord ends of the optical fiber cords led out from the optical fiber cable.

In the case of the apparatus for assembly and inspection, the processors 26 to 31 of the connector side end processing apparatus are laid as inclination in the direction of the leadout portion where the optical fiber cords are led out. And the processors 32 to 37 are also laid as inclination in the direction of the leadout portion where the optical fiber cords are led out. Conveyance means 12b, 12c are laid along these processors 26 to 31 and 32 to 37 of the connector side end processing apparatus 10, which are enabled to reciprocate straight. A conveyor 14b is laid between these conveyance means 12b, 12c so as to use for the process of heating and drying the adhesive.

On the other hand, the processors 62 to 65 of the inspection side end processing apparatus shown in FIG. 6, in the same way of the embodiment shown in FIG. 5, are laid straight against the attachment place of the roof of the leadout portion where the optical fiber cords are led out. A conveyor 14c is laid at the half-rectangular place where conveyance means 12d is laid along the processors 62 to 65.

As explained above, the arrangement shape of the cord ends in the present invention is possible to be changed in various manners, such as a circler shape shown in FIG. 2, or such as straight shapes shown in FIG. 5 and FIG. 6.

Figure 7:
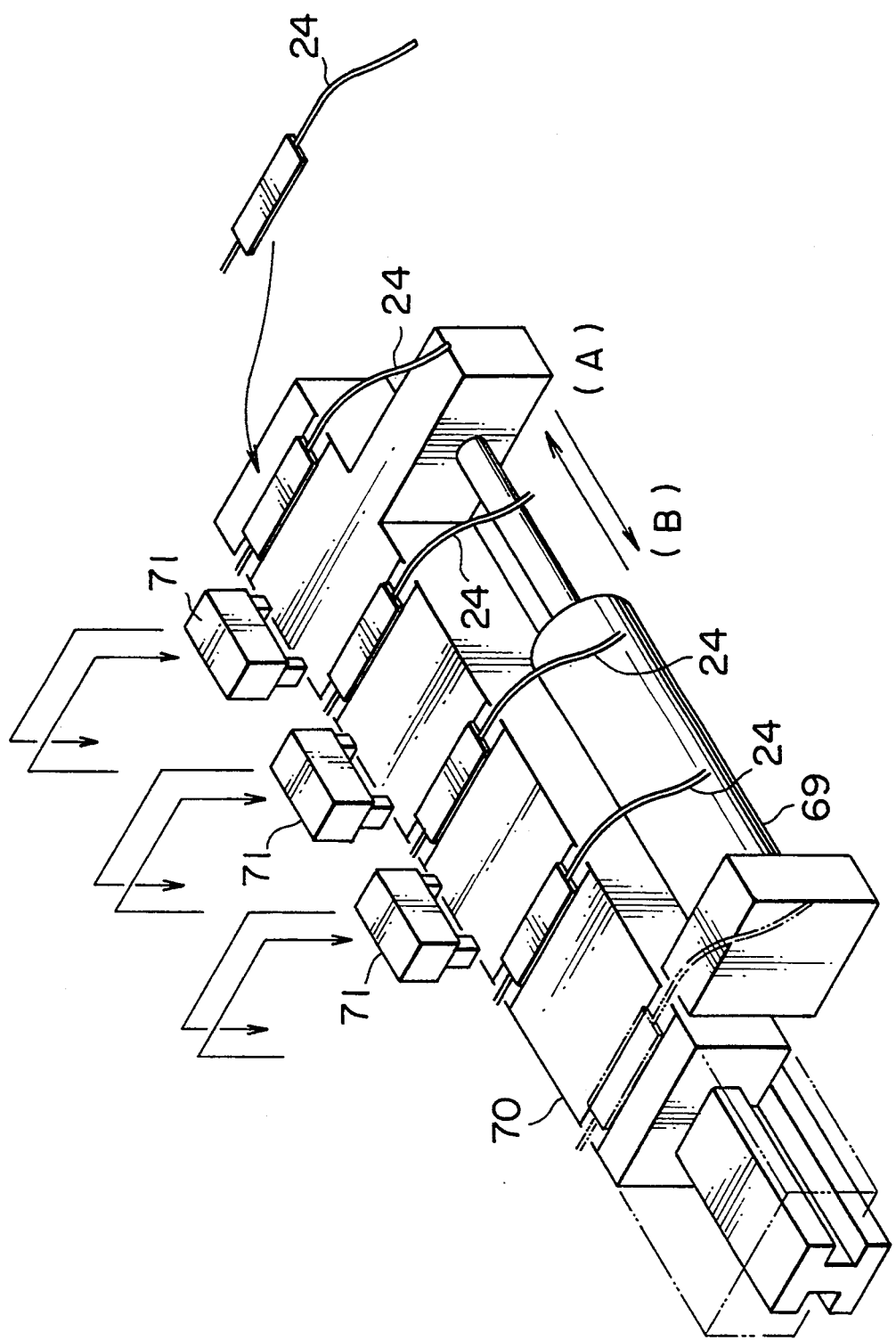
FIG. 7 is a schematic perspective view showing the convenyance means of the embodiments showed in FIG. 5 and FIG. 6.

As shown in FIG. 7, these conveyance means 12b, 12c, 12d in the above-mentioned embodiments shown in FIG. 5 and FIG. 6 are each provided so that a sliding table 70 on which each optical fiber cords are set at a predetermined pitch is possible to reciprocate by an air-cylinder 69.

The stroke length of the reciprocation is made to match the setting pitch of the optical fiber cord, i.e. the arrangement pitch of processors. When the stroke ends of the reciprocation are (A) and (B) shown in FIG. 7, the sliding table 70 is moved (A) to (B) so that the optical fiber cords are fed in a lump.

After the optical fiber cords are held to each processor by handling apparatuses 71 of the optical fiber cords, the sliding table 70 is returned to (A). The optical fiber cords which have been processed by the processors are returned on the sliding table 70 by the handling apparatuses 71, result in each optical fiber cord being fed at one pitch. The optical fiber cords are processed the ends of themselves in turn because of repeating these motions.

The explanations of the processors 26 to 37 and 62 to 65 are omitted because their functions are the same as the above-mentioned embodiment. Conveyors 14b, 14c, 14d shown in FIG. 5 and FIG. 6 are the same as the above-mentioned embodiment, so their explanations are omitted.

Note that the present invention is not limited to the above-mentioned embodiments and it is possible to change it in various manners within the scope of the present invention.

For example, in the above-mentioned embodiment, use was made of the setting conveyors 14a and 14c and the heating and drying conveyor 14b, but these conveyors need not be used, but use made of other conveyance means. For example, in place of the conveyor which is indexed, it is possible to use a compact index table with a small feed pitch angle using part of the periphery. Further, the conveyors 14a, 14b, and 14c need not be used. It is possible to use the index tables 12 and 12a to perform the process of setting the cord ends and the process of heating and drying.

Further, in the above-mentioned embodiment, use is made of the apparatus of the present invention in the case of end processing of an optical fiber cable where a large number of multi-core optical fiber cords are accommodated, but according to the apparatus of the present invention, it is possible to apply the apparatus of the present invention even in the case of end processing of a plurality of single-core or multi-core optical fiber cords or optical fiber cables.

As explained above, according to the present invention, the trouble involved in finding the corresponding ends of other sides of optical fiber cords to which connectors are assembled after attaching connectors to ends of one side of the optical fiber cords is eliminated. Further, the process of assembling the connectors and the process of inspecting the optical fiber cords can be performed continuously and automatically, so the trouble of arranging and maintaining the ends of the optical cable cords in a predetermined order, which occurred in the case of automating only the process of assembly of the connectors, can be resolved. Therefore, in particular, the inspection process becomes easy and also it becomes possible to shorten the time required for inspection.

Many widely different embodiments of the present invention may be constructed without departing from the spirit and scope of the present invention, and it should be understood that the present invention is not restricted to the specific embodiments described above.

We claim:

1. A method of assembly and inspection of optical fiber connectors which attaches connectors to at least one cord end of a plurality of optical fiber cords in which single or multiple optical fibers are accommodated and inspects connection characteristics due to connection of the connectors, said method of assembly and inspection of optical fiber connectors comprising:
    linking steps of connecting the connectors to cord ends where the connectors are assembled, processing the other cord ends and inspecting the connection characteristics of the optical fibers due to connection of the connectors; and
    continuously assembling and inspecting the connectors using the linking.

2. A method of assembly and inspection of optical fiber connectors which attaches connectors to at least one cord end of a plurality of optical fiber cords in which single or multiple optical fibers are accommodated and inspects connection characteristics due to connection of the connectors, said method of assembly and inspection of optical fiber connectors comprising the steps of:
    connecting the connectors to cord ends where the connectors are assembled,
    processing the other cord ends, and
    inspecting the connection characteristics of the optical fibers due to connection of the connectors comprising
        connecting one of the connectors which are connected to the cord ends where the connectors are assembled for measurement using a master connector,
        inputting an inspection light beam from a light source into the optical fiber cord to which the master connector is connected,
        attaching a master connector connected to a light receiving sensor to the other cord end, and
        measuring the connection characteristics using a light power meter.

3. A method of assembly and inspection of optical fiber connectors in claim 2, wherein said step of measuring the connection characteristics has a step of inspecting a fiber correspondence to check whether the optical fibers are inserted in a proper order in the connector.

4. A method of assembly and inspection of optical fiber connectors which attaches connectors to at least one cord end of a plurality of optical fiber cords in which single or multiple optical fibers are accommodated and inspects connection characteristics due to connection of the connectors, said method of assembly and inspection of optical fiber connectors comprising the steps of:
    connecting the connectors to the cord ends where the connectors are assembled, comprising:
        inserting the cord end of optical fiber cords led out from a leadout portion of an optical fiber cable into through holes of a boot and attaching the boot over the outer circumference of the cords,
        stripping a tip of the cord ends on which the boot is attached to expose front ends of the optical fibers,
        wiping off and cleaning the outer circumferential surface of the exposed optical fibers,
        passing the optical fibers through holes formed in the connector and attaching the connector to the cord ends so as to expose the optical fibers from the front end of the connector,
        moving the boot to the front end of the cords and connecting the boot to the rear end of the connector,
        injecting and coating an adhesive in a window formed in the connector to fix the optical fibers, passed through the connector, to the connector,
        drying the cord ends having the connector in which the adhesive is injected,
        cutting the optical fibers exposed from the front end of the connector and polishing the front end surfaces of the optical fibers,
    processing the other cord ends, and
    inspecting the connection characteristics of the optical fibers due to connection of the connectors.

5. A method of assembly and inspection of optical fiber connectors in claim 1, wherein said process of processing the other cord ends has steps of:
    stripping a tip of the other cord ends to expose front ends of the optical fibers, and
    wiping off and cleaning the outer circumferential surface of the exposed optical fibers.

* * * * *

UNITED STATES PATENT AND TRADEMARK OFFICE
CERTIFICATE OF CORRECTION

PATENT NO.  : 5,347,698
DATED       : September 20, 1994
INVENTOR(S) : Kinoshita et al.

It is certified that error appears in the above-indentified patent and that said Letters Patent is hereby corrected as shown below:

Title Page, under "References Cited" insert the following:
-- FOREIGN PATENT DOCUMENTS
2157846A  10/1985  Great Britain
    OTHER PUBLICATIONS
European Search Report for Application No. EP 92112070

Patent Abstract of Japan - Publication No. JP 3229207, published 11/10/91

Patent Abstract of Japan - Publication No. JP 4104032, published 6/4/92--

Column 5, line 6, delete "(".

Signed and Sealed this

Fifteenth Day of August, 1995

Attest:

BRUCE LEHMAN

*Attesting Officer*     *Commissioner of Patents and Trademarks*